United States Patent
Ayichew et al.

(10) Patent No.: US 9,533,666 B2
(45) Date of Patent: Jan. 3, 2017

(54) BRAKE FORCE MEASUREMENT TECHNIQUES

(71) Applicant: Goodrich Corporation, Charlotte, NC (US)

(72) Inventors: Efrem E. Ayichew, Troy, OH (US); Richard Kolk, Louisville, KY (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 14/671,642

(22) Filed: Mar. 27, 2015

(65) Prior Publication Data
US 2016/0280198 A1    Sep. 29, 2016

(51) Int. Cl.
| B60T 17/22 | (2006.01) |
| B60T 8/171 | (2006.01) |
| B60W 20/00 | (2016.01) |

(52) U.S. Cl.
CPC ............... *B60T 17/22* (2013.01); *B60T 8/171* (2013.01)

(58) Field of Classification Search
CPC ...... B60W 20/00; B60W 10/08; B60W 10/06; B60T 17/22; B60T 8/171
USPC .......................................... 701/70, 80; 477/5
See application file for complete search history.

(56) References Cited

U.S. PATENT DOCUMENTS

| 6,601,435 B2* | 8/2003 | Hong | .................... | G01M 17/02 701/80 |
| 7,424,937 B2 | 9/2008 | Henry | | |
| 2016/0059846 A1* | 3/2016 | Wang | .................... | B60W 20/40 477/5 |

FOREIGN PATENT DOCUMENTS

| EP | 1695887 | 8/2006 |
| WO | 0168428 | 9/2001 |

OTHER PUBLICATIONS

Extended European Search Report dated Aug. 19, 2016 in European Application No. 16161831.9.

* cited by examiner

*Primary Examiner* — Tan Q Nguyen
(74) *Attorney, Agent, or Firm* — Snell & Wilmer, L.L.P.

(57) ABSTRACT

The present disclosure provides systems and methods related to determining observed applied brake force of an aircraft braking system. In various embodiments, a system for calculating observed applied force comprises a current sensor in communication with a controller, a position sensor in communication with the controller and configured to measure a rotational speed of a motor shaft, and a tangible, non-transitory memory configured to communicate with the controller. In various embodiments, the tangible, non-transitory memory may have instructions stored thereon that, in response to execution by the controller, cause the controller to perform operations comprising receiving, by the controller, a motor current from the current sensor at a first time, calculating, by the controller, a first electromagnetic torque, calculating, by the controller, a first flywheel angular velocity, receiving, by the controller, a motor shaft angular velocity from the position sensor at a second time, subtracting, by the controller, the first flywheel angular velocity and the motor shaft angular velocity received at the second time to obtain a first angular velocity difference, calculating, by the controller, a first observed disturbance torque, and calculating, by the controller, a first observed applied force.

15 Claims, 5 Drawing Sheets

BRAKE FORCE MEASUREMENT TECHNIQUES

FIELD OF THE DISCLOSURE

The present disclosure relates to braking systems and methods, and more particularly, to systems and methods for determining observed applied brake force.

BACKGROUND OF THE DISCLOSURE

Conventional aircraft wheel assemblies comprise rotating and stationary stacks which stop the aircraft when compressed by one or more rams. A ram may be attached to an actuator, such as an electromechanical actuator. Typically, electromechanical actuators are controlled by electromechanical actuator controllers. To properly account for variations in operating loads on the aircraft brake assemblies, electromechanical actuators frequently include load cells which provide feedback to the actuator. Load cells are often calibrated manually, which may require significant time and labor, or rely on precision force measurement and control, which may be subject to signal corruption and degradation. Load cells are electromechanical parts that impart sizeable complexity and cost to an electromechanical actuation part/system.

SUMMARY OF THE DISCLOSURE

In various embodiments, the present disclosure provides systems for determining observed applied force. In various embodiments, the system may comprise a current sensor and a position sensor in communication with a controller. In various embodiments, the current sensor and position sensor may be configured to measure the current and rotational speed of an electromechanical brake actuator motor. In various embodiments, the controller may be programmed to calculate an observed applied brake force applied by a brake in response to application of current to an electromechanical brake actuator motor.

In various embodiments, the present disclosure provides methods for determining observed applied force. In various embodiments, the system may comprise utilizing current and rotational speed inputs to calculate an observed disturbance torque. In various embodiments, the observed disturbance torque may be utilized to calculate an observed applied brake force. In various embodiments, the observed applied brake force may be compared to a commanded force.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods and systems may find particular use in connection with electromechanical brake actuators and electromechanical brake actuator controllers for aircraft brake systems. However, various aspects of the disclosed embodiments may be adapted for optimized performance in a variety of electromechanical actuators and electromechanical actuator controllers. As such, numerous applications of the present disclosure may be realized.

Figure 1:
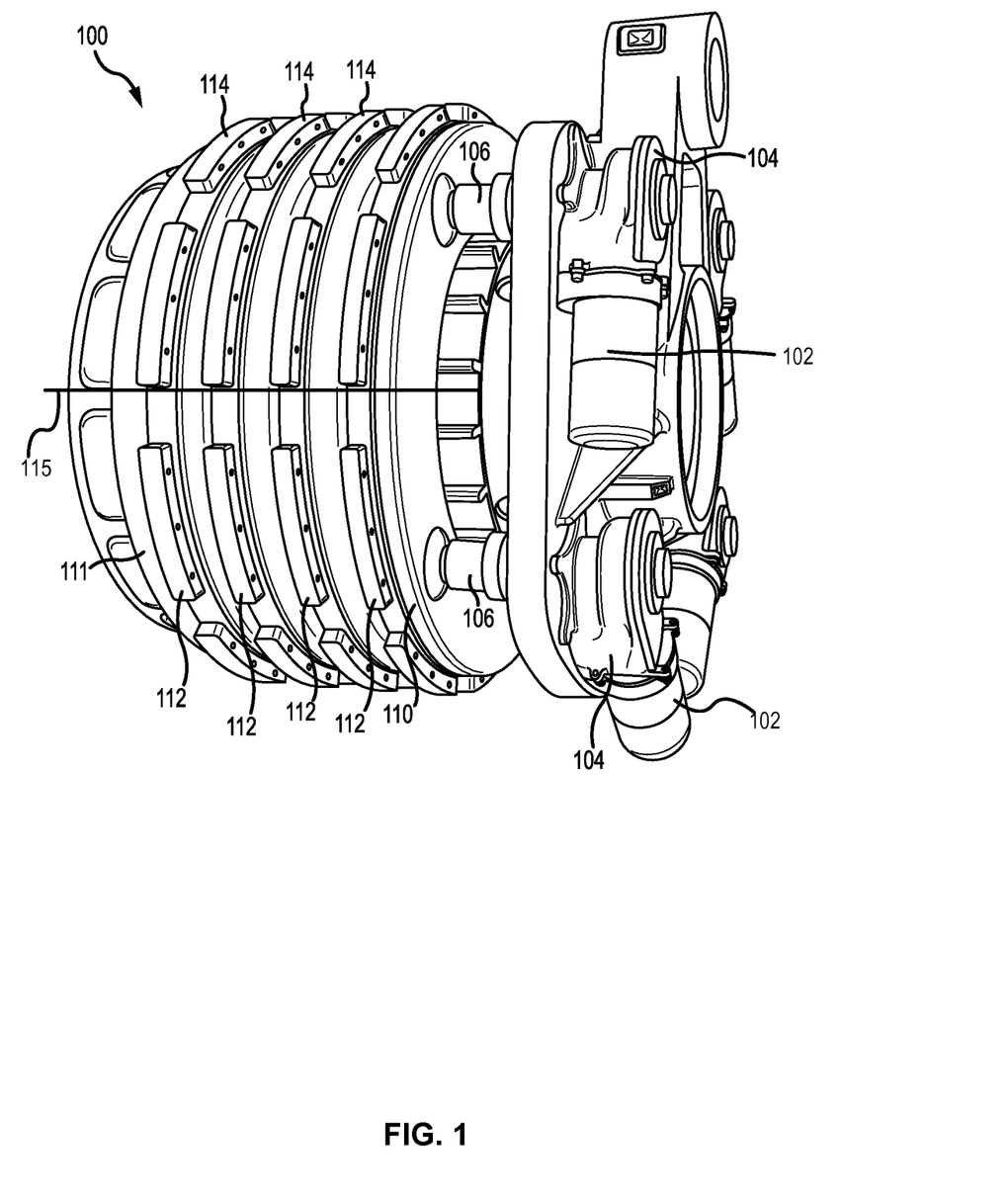
FIG. 1 illustrates an aircraft brake in accordance with various embodiments.

FIG. 1 illustrates an aircraft brake 100 in accordance with various embodiments. Aircraft brake 100 includes a plurality of actuator motors 102, a plurality of electromechanical brake actuators 104, a plurality of ball nuts 106, an end plate 111 and a pressure plate 110, and a plurality of rotating discs 112 and stators 114 positioned in an alternating fashion between end plate 111 and pressure plate 110. Rotating discs 112 may rotate about an axis 115 and the stators 114 may have no angular movement relative to axis 115. Wheels may be coupled to rotating discs 112 such that a linear speed of the aircraft is proportional to the angular speed of rotating discs 112. As force is applied to pressure plate 110 towards end plate 111 along the axis 115, rotating discs 112 and stators 114 are forced together in an axial direction. This causes the rotational speed of rotating discs 112 to become reduced (i.e., causes braking effect) due to friction between rotating discs 112, stators 114, end plate 111 and pressure plate 110. When sufficient force is exerted on rotating discs 112 via pressure plate 110, the rotating discs 112 will stop rotating.

In order to exert this force onto pressure plate 110, actuator motor 102 may cause electromechanical brake actuator 104 to actuate. In various embodiments, actuator motor 102 may be a brushless motor, such as a permanent magnet synchronous motor (PMSM), a permanent-magnet motor (PMM) or the like. In various embodiments, and with reference to FIG. 2, electromechanical brake actuator 104 may be coupled to or otherwise operate a motor shaft 204 and a pressure generating device, such as, for example, a ball screw, a ram, and/or the like. In response to actuation, electromechanical brake actuator 104 causes the motor shaft 204 to rotate. Rotation of the motor shaft 204 may cause rotation of a ball screw 206, and rotational motion of the ball screw 206 may be transformed into linear motion of a ball nut 106. With reference again to FIG. 1, linear translation of ball nut 106 towards pressure plate 110 applies force on pressure plate 110 towards end plate 111.

Electromechanical brake actuator 104 is actuated in response to current being applied to actuator motor 102. The amount of force applied by electromechanical brake actuator 104 is related to the amount of current applied to actuator motor 102. With reference again to FIG. 2, in various embodiments, an electromechanical brake actuator control system 200 may comprise a current sensor 202 to detect an amount of current provided to actuator motor 102. Current sensor 202 may be in communication with actuator motor 102 and/or with various other components of an electromechanical brake actuator 104, an electromechanical brake actuator control system 200, and/or an aircraft. In various embodiments, current sensor 202 may be disposed on or adjacent to actuator motor 102. However, current sensor 202 may be disposed in any location suitable for detection of electrical current supplied to the actuator motor 102.

Figure 2:
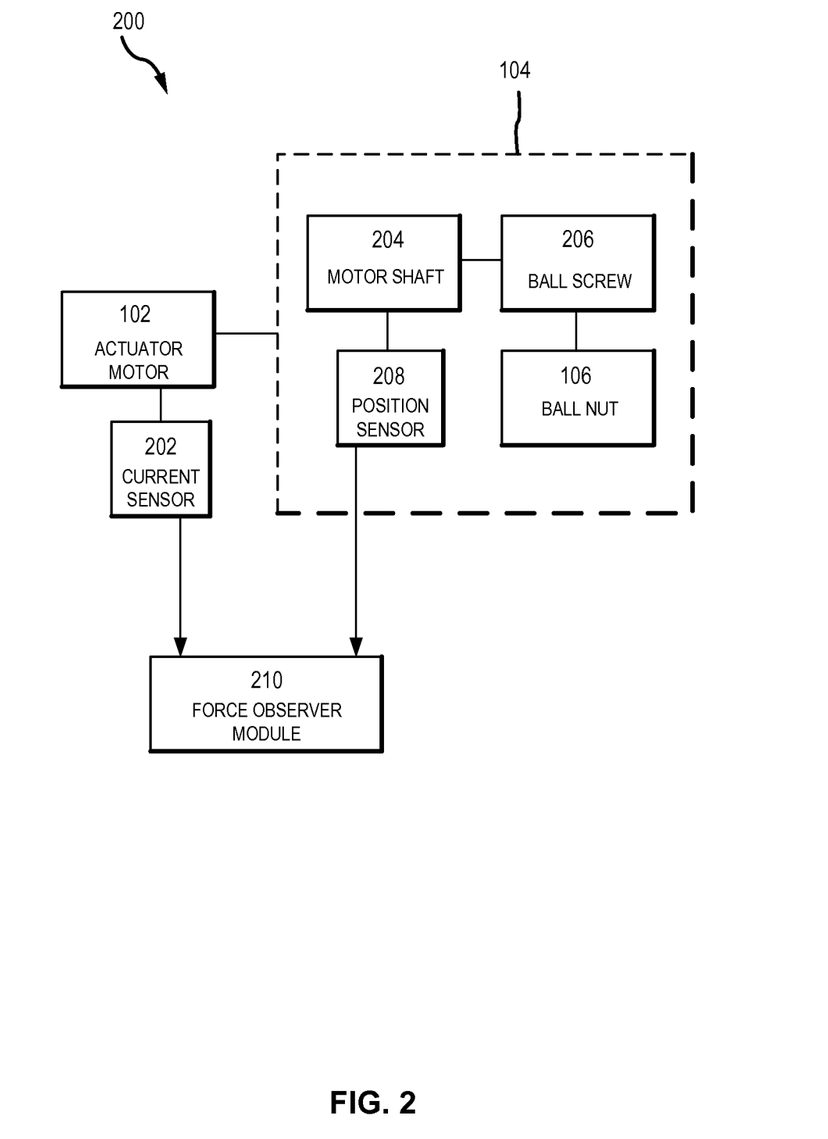
FIG. 2 illustrates a block diagram of an electromechanical brake actuator control system in accordance with various embodiments.

Application of current to actuator motor 102 causes rotation of motor shaft 204. In various embodiments, electromechanical brake actuator control system 200 may comprise a position sensor 208. Position sensor 208 may be configured so as to measure the rotational speed and position of motor shaft 204. In various embodiments, position sensor 208 may be disposed in or adjacent to electromechanical brake actuator 104, or on or adjacent to actuator motor 102. However, position sensor 208 may be disposed in any location suitable for detection of the rotational speed and position of motor shaft 204. In various embodiments, position sensor 208 may comprise a resolver, tachometer, or the like.

As already discussed, the amount of force applied by electromechanical brake actuator 104 is related to the amount of current applied to actuator motor 102 and the resulting rotation of motor shaft 204. It is desirable to determine this amount of force. One way to determine this force is to use a load cell and/or force sensor within electromechanical brake actuator 104. However, it may be desirable to determine this force without the use of a load cell and/or force sensor. Because the amount of force applied by electromechanical brake actuator 104 is related to the current applied to actuator motor 102 and the resulting rotation of motor shaft 204, it is possible to estimate the observed applied force. Thus, a controller may receive the detected current and rotational speed, and calculate an observed applied force based on those detected values. In various embodiments, electromechanical brake actuator control system 200 may comprise a force observer module 210.

In various embodiments, a system for calculating observed applied brake force comprises a current sensor 202 and a position sensor 208 and at least one controller. The system for calculating observed applied brake force may comprise a force observer module 210. Force observer module 210 may be configured to estimate the force applied by brake actuator 104 to pressure plate 110 (with momentary reference to FIG. 1) based on data from current sensor 202 and position sensor 208. In various embodiments, force observer module 210 may be a controller and/or processor. In various embodiments, force observer module 210 may be implemented in a single controller and/or processor. In various embodiments, force observer module 210 may be implemented in multiple controllers and/or processors. In various embodiments, force observer module 210 may be implemented in an electromechanical actuator controller and/or a brake control unit.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. §101.

Figure 3:
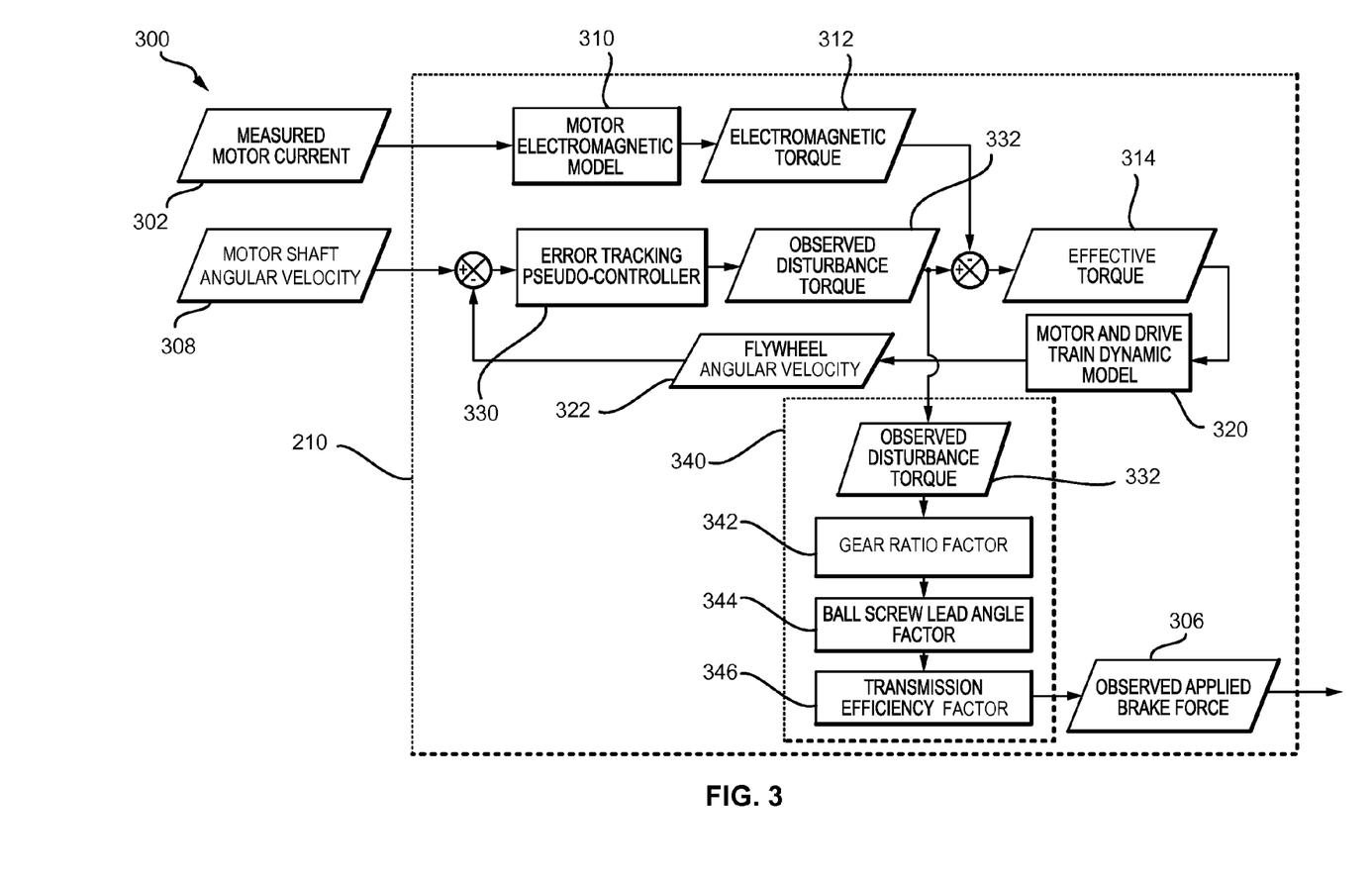
FIG. 3 illustrates a schematic view of a system for determining applied brake force in accordance with various embodiments.

FIG. 3 illustrates a system 300 for calculating observed applied force. In various embodiments, system 300 may comprise a closed-loop system. In various embodiments, system 300 may be implemented in a machine-readable non-transitory medium and performed by a controller. In various embodiments, system 300 may be implemented on a special use controller, field programmable gate array, or the like. In various embodiments, system 300 may be implemented on one or more controllers.

In various embodiments, system 300 outputs an estimate of the observed applied force 306. In various embodiments, system 300 utilizes motor current 302 and motor shaft angular velocity 308 as inputs. With momentary reference to FIGS. 2 and 3, in various embodiments, motor current 302 may comprise an electrical current supplied to an actuator motor 102 in response to a command by an electromechanical brake actuator 104. In various embodiments, motor shaft angular velocity 308 may comprise the rotational speed of a motor shaft 204 in response to application of motor current 302. Motor current 302 may comprise an electric current measured by current sensor 202; motor shaft angular velocity 308 may comprise a rotational speed measured by position sensor 208.

With reference again to FIG. 3, in various embodiments, motor electromagnetic model 310 utilizes motor current 302 as an input. Motor electromagnetic model 310 calculates an electromagnetic torque 312. Electromagnetic torque 312 may represent the torque expected to result from the application of a particular current to the actuator motor 102 (with momentary reference to FIG. 2). In various embodiments, motor and drive train dynamic model 320 may utilize electromagnetic torque 312 as an input. Motor and drive train dynamic model 320 calculates a flywheel angular velocity 322. Flywheel angular velocity 322 may represent the maximum angular velocity expected to result from application of a particular torque to the motor shaft 204 (with momentary reference to FIG. 2) in the absence of resistance.

In various embodiments, motor shaft angular velocity 308 and flywheel angular velocity 322 are subtracted to obtain a motor shaft angular velocity difference. In various embodiments, error tracking pseudo-controller 330 utilizes the motor shaft angular velocity difference as an input. Error tracking pseudo-controller 330 calculates an observed disturbance torque 332.

In various embodiments, system 300 comprises a recursive closed-loop system configured to incorporate previously calculated values into current calculations. The primary function of error tracking pseudo-controller 330 is to dynamically calculate observed disturbance torque 332 such that the difference between motor shaft angular velocity 308 and flywheel angular velocity 322 approaches and/or equals zero. For example, in various embodiments, a motor current 302 may be measured and/or received at a first time. Motor electromagnetic model 310 may calculate a first electromagnetic torque 312 from the motor current 302 measured at a first time. Motor and drive train dynamic model 320 may calculate a first flywheel angular velocity 322 from the electromagnetic torque 312. A motor shaft angular velocity 308 may be measured and/or received at a second time. The first time may be before, simultaneous with, or after the second time. The motor shaft angular velocity 308 measured at a second time and the first flywheel angular velocity 322 may be subtracted to obtain a first angular velocity difference. Error tracking pseudo-controller 330 may calculate a first observed disturbance torque 332 from the angular velocity difference.

In various embodiments, observed disturbance torque 332 may be utilized to calculate a first observed applied force 306 and/or may be utilized as an input in a recursive loop of system 300. For example, a motor current 302 may be measured and/or received at a third time. The third time may be subsequent to the first time and may be before, simultaneous with, or after the second time. Motor electromagnetic model 310 may calculate a second electromagnetic torque 312 from the motor current 302 measured at the third time. In various embodiments, the electromagnetic torque 312 and the first observed disturbance torque may be subtracted to determine a first effective torque 314. Motor and drive train dynamic model 320 may calculate a second flywheel angular velocity 322 from the first effective torque 314. A motor shaft angular velocity 308 may be measured and/or received at a fourth time. The fourth time may be after the second time, and may be before, simultaneous with, or after the third time. The motor shaft angular velocity 308 measured at a fourth time and the second flywheel angular velocity 322 may be subtracted to obtain a second angular velocity difference. Error tracking pseudo-controller 330 may calculate a second observed disturbance torque 332 from the second angular velocity difference. In various embodiments, the previously described recursive loop may be repeated any suitable number of times.

In various embodiments, system 300 may comprise a torque to force algorithm 340. Torque to force algorithm 340 may utilize observed disturbance torque as an input. In various embodiments, torque to force algorithm 340 may calculate observed applied force 306 from observed disturbance torque 332. Torque to force algorithm 340 may be configured to account for various operating conditions and/or system configurations in calculating observed applied force 306 from observed disturbance torque 332. In various embodiments, torque to force algorithm 340 utilizes at least one of a gear ratio factor 342, a ball screw lead angle factor 344, and a transmission efficiency factor 346 to calculate observed applied force 306. Gear ratio factor 342 may represent the multiplication of torque and/or reduction of speed by a gear box in deriving rotational speed from a given torque based upon characteristics of the gear box. Ball screw lead angle factor 344 may represent the conversion of rotational motion to linear translational motion. Transmission efficiency factor 346 may account for various other operating conditions including, but not limited to, machine wear, temperature, and the like.

In various embodiments, observed applied force 306 may be communicated to an electromechanical actuator controller, to a brake control unit, and/or to various other portions of an aircraft brake system or aircraft control system. In various embodiments, a controller may compare an observed applied force to a commanded force. In various embodiments, a controller may utilize an observed applied force as an input.

Figure 4:
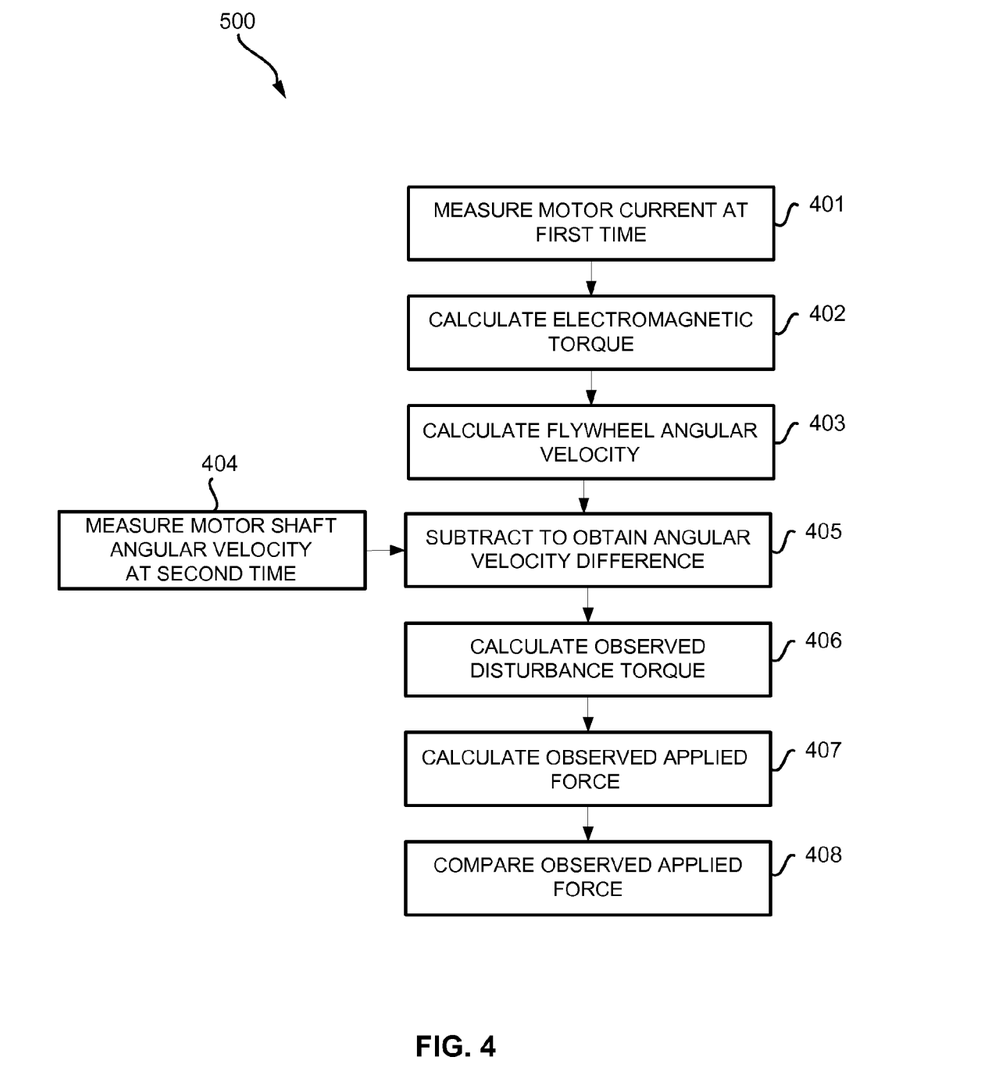
FIG. 4 illustrates a method of determining applied brake force in accordance with various embodiments.

FIG. 4 illustrates a method for determining observed applied force 400. In various embodiments, method 400 may comprise measuring and/or receiving a motor current at a first time (Step 401) by/from a current sensor, and calculating a first electromagnetic torque by a motor electromagnetic model (Step 402). In various embodiments, method 400 may further comprise calculating a first flywheel angular velocity by a motor and drive train dynamic model (Step 403). In various embodiments, method 400 may further comprise measuring and/or receiving a motor shaft angular velocity at a second time (Step 404) by/from a position sensor. In various embodiments, method 400 may further comprise subtracting the first flywheel angular velocity and the motor shaft angular velocity received at a second time to obtain a first angular velocity difference (Step 405), and calculating a first observed disturbance torque by an error tracking pseudo-controller (Step 406). In various embodiments, method 400 may further comprise calculating a first observed applied force (Step 407). In various embodiments, a torque to force algorithm may be utilized to calculate the first observed applied force. In various embodiments, the torque to force algorithm may comprise at least one of a gear ratio factor, a ball screw lead angle factor, and a transmission efficiency factor. In various embodiments, method 400 may further comprise comparing a first observed applied force to a commanded force (Step 408).

Figure 5:
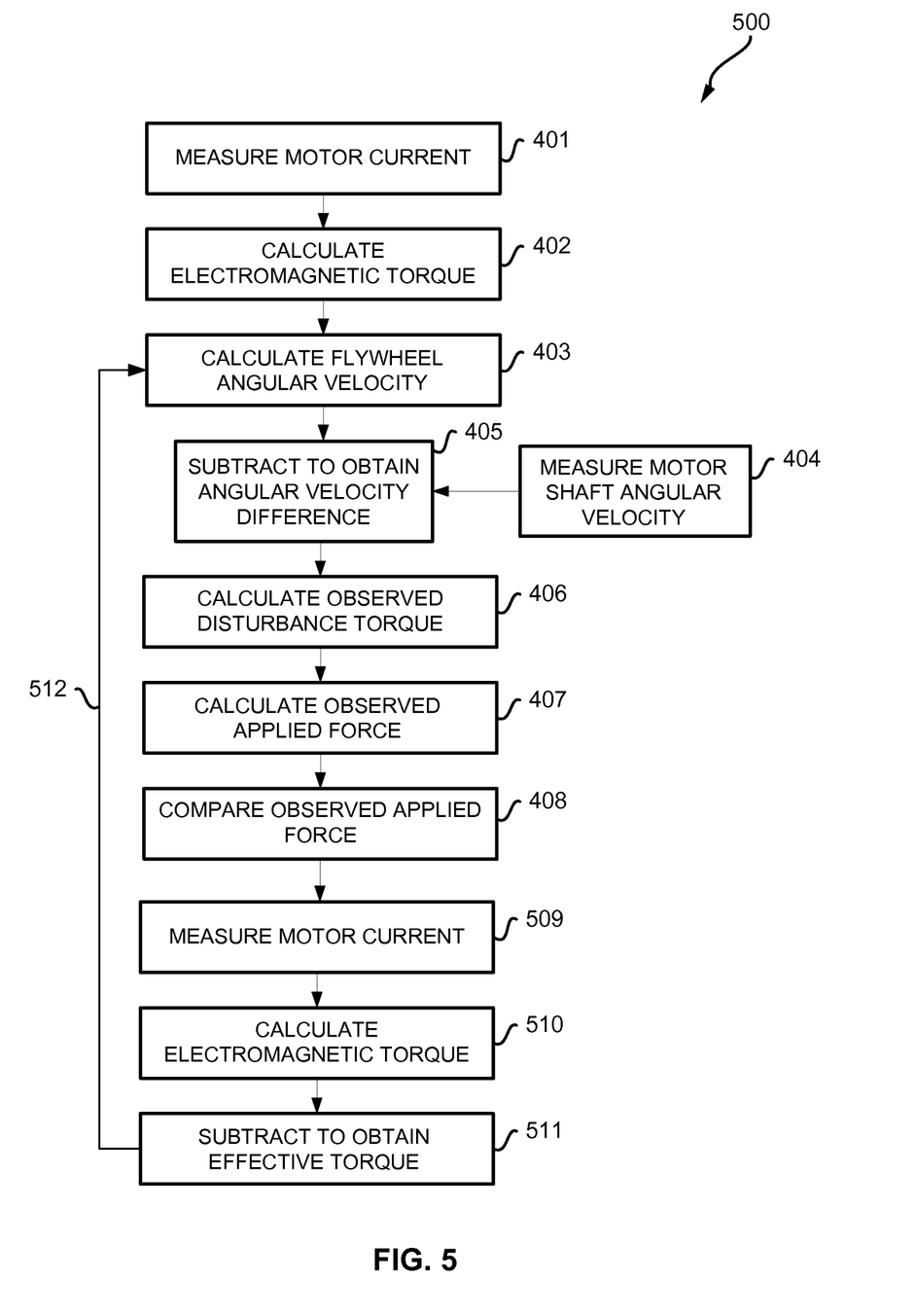
FIG. 5 illustrates a further method of determining applied brake force in accordance with various embodiments.

In various embodiments and with reference to FIG. 5, a method for determining observed applied force 500 may comprise method 400 in whole or in part, and may further comprise measuring and/or receiving a motor current at a third time (Step 509) by/from a current sensor. In various embodiments, method 500 may further comprise calculating a second electromagnetic torque by a motor electromagnetic model (Step 510). In various embodiments, method 500 may further comprise subtracting the second electromagnetic torque and the first observed disturbance torque to determine a first effective torque. In various embodiments, method 500 may further comprise calculating a second flywheel angular velocity by a motor and drive train dynamic model from the first effective torque (Step 403). In various embodiments, method 500 may further comprise measuring and/or receiving a motor shaft angular velocity at a fourth time (Step 404) by/from a position sensor. In various embodiments, method 500 may further comprise subtracting the second flywheel angular velocity and the motor shaft angular velocity measured at a fourth time to obtain a second angular velocity difference (Step 405), and calculating a second observed disturbance torque by an error tracking pseudo-controller (Step 406). In various embodiments, method 500 may further comprise calculating a second observed applied force (Step 407) and comparing the second observed applied force to a commanded force (Step 408).

Method 500 may be recursive in whole or in part. In various embodiments, one or more steps of method 500 may be repeated (Step 512) any suitable number of times.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Devices and methods are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for calculating observed applied force, comprising:
   a current sensor, in communication with a controller;
   a position sensor, in communication with the controller and configured to measure a rotational speed of a motor shaft; and
   a tangible, non-transitory memory configured to communicate with the controller, the tangible, non-transitory memory having instructions stored thereon that, in response to execution by the controller, cause the controller to perform operations comprising:
   receiving, by the controller, a motor current from the current sensor at a first time;
   calculating, by the controller, a first electromagnetic torque;
   calculating, by the controller, a first flywheel angular velocity;
   receiving, by the controller, a motor shaft angular velocity from the position sensor at a second time;
   subtracting, by the controller, the first flywheel angular velocity and the motor shaft angular velocity received at the second time to obtain a first angular velocity difference;
   calculating, by the controller, a first observed disturbance torque; and
   calculating, by the controller, a first observed applied force.

2. The system of claim 1, wherein the controller uses the first observed disturbance torque, a gear ratio factor, a ball screw lead angle factor, and a transmission efficiency factor to calculate the first observed applied force.

3. The system of claim 1, wherein the operations further comprise:
   comparing the first observed applied force to a commanded force.

4. The system of claim 1, wherein the instructions cause the controller to perform the operations further comprising:
   receiving, by the controller, a motor current from the current sensor at a third time;
   calculating, by the controller, a second electromagnetic torque;
   subtracting, by the controller, the first observed disturbance torque and the second electromagnetic torque to obtain an effective torque;
   calculating, by the controller, a second flywheel angular velocity;
   receiving, by the controller, a motor shaft angular velocity from the position sensor at a fourth time;
   subtracting, by the controller, the second flywheel angular velocity and the motor shaft angular velocity received at the fourth time to obtain a second angular velocity difference;
   calculating, by the controller, a second observed disturbance torque; and
   calculating, by the controller, a second observed applied force.

5. The system of claim 4, wherein the instructions cause the controller to perform the operations further comprising:
   comparing the second observed applied force to a commanded force.

6. The system of claim 5, wherein the instructions cause the controller to perform the operations further comprising:
   repeating the receiving the motor current at the third time, the calculating the electromagnetic torque, the subtracting the first observed disturbance torque and the second electromagnetic torque, the calculating the second flywheel angular velocity, the receiving the motor shaft angular velocity at the fourth time, the subtracting the second flywheel angular velocity received at the fourth time and the second motor shaft angular velocity, the calculating the second observed disturbance torque, the calculating the second observed applied force, and the comparing the second observed applied force to the commanded force.

7. The system of claim 4, wherein the position sensor comprises at least one of a resolver and a tachometer.

8. The system of claim 4, wherein the controller comprises an electromechanical motor actuator controller.

9. The system of claim 4, wherein the controller comprises an electromechanical brake controller unit.

10. A method for determining an observed applied force, comprising:
    Measuring, by a current sensor in communication with a controller, a motor current at a first time;
    Calculating, by the controller, a first electromagnetic torque;

Calculating, by the controller, a first flywheel angular velocity;

measuring, by a position sensor in communication with the controller, a motor shaft angular velocity at a second time;

subtracting, by the controller, the first flywheel angular velocity and the motor shaft angular velocity measured at the second time to obtain a first angular velocity difference;

calculating, by the controller, a first observed disturbance torque; and calculating, by the controller, a first observed applied force.

11. The method of claim 10, wherein the first observed disturbance torque, a gear ratio factor, a ball screw lead angle factor, and a transmission efficiency factor are used to calculate the first observed applied force.

12. The method of claim 10, further comprising:

comparing, by the controller, the first observed applied force to a commanded force.

13. The method of claim 10, further comprising:

Measuring, by the current sensor, a motor current at a third time;

calculating, by the controller, a second electromagnetic torque;

subtracting, by the controller, the first observed disturbance torque and the second electromagnetic torque to obtain a first effective torque;

calculating, by the controller, a second flywheel angular velocity;

measuring, by the position sensor, a motor shaft angular velocity at a fourth time;

subtracting, by the controller, the second flywheel angular velocity and the motor shaft angular velocity measured at the fourth time to obtain a second angular velocity difference;

calculating, by the controller, a second observed disturbance torque; and calculating, by the controller, a second observed applied force.

14. The method of claim 13, further comprising:

comparing, by the controller, the second observed applied force to a commanded force.

15. The method of claim 14, further comprising:

repeating, as needed, the measuring the motor current, the calculating the second electromagnetic torque, the subtracting the first observed disturbance torque and the second electromagnetic torque, the calculating the second flywheel angular velocity, the measuring the motor shaft angular velocity at the fourth time, the subtracting the second flywheel angular velocity and the motor shaft angular velocity measured at the fourth time, the calculating the second observed disturbance torque, the calculating the second observed applied force, and the comparing the second observed applied force to the commanded force.

* * * * *